United States Patent [19]

Mintz et al.

[11] Patent Number: 4,768,538
[45] Date of Patent: Sep. 6, 1988

[54] RADIAL SEAL HYDRAULIC COUPLER

[75] Inventors: Robert A. Mintz; Michael R. Fitzgibbons; James A. Sweety, all of Houston, Tex.

[73] Assignee: Ferranti Subsea Systems, Inc., Sugar Land, Tex.

[21] Appl. No.: 126,033

[22] Filed: Nov. 27, 1987

[51] Int. Cl.⁴ .............................................. F16L 37/28
[52] U.S. Cl. .................. 137/15; 137/614.04; 277/236
[58] Field of Search ............ 137/15, 315, 614.03, 137/614.04; 277/116.2, 205, 236; 251/363; 29/157.1 R, 402.02

[56] References Cited

U.S. PATENT DOCUMENTS

| 2,772,068 | 11/1956 | Grove et al. | 251/363 |
| 3,201,151 | 8/1965 | Westveer | 137/614.04 |
| 3,205,911 | 9/1965 | Swich, Jr. | 277/236 |
| 3,460,801 | 8/1969 | Norton | 137/614.04 |
| 3,788,348 | 1/1974 | Johnson | 137/614.04 |
| 4,323,003 | 4/1982 | Clippard, III | 92/87 |
| 4,324,407 | 4/1982 | Uphan et al. | 277/236 |
| 4,476,772 | 10/1984 | Gorman et al. | 92/168 |
| 4,556,196 | 12/1985 | Nimberger | 251/214 |

FOREIGN PATENT DOCUMENTS

| 2736336 | 2/1979 | Fed. Rep. of Germany | 137/614.04 |
| 3300328 | 7/1984 | Fed. Rep. of Germany | 137/614.04 |
| 1239825 | 7/1960 | France | 137/614.04 |
| 1245134 | 9/1971 | United Kingdom | 137/614.04 |

OTHER PUBLICATIONS

"Resilient Metal Gaskets" Ener Ring Advanced Products Design Manual, New Haven, Conn., 1983.

Primary Examiner—A. Michael Chambers
Attorney, Agent, or Firm—Browning, Bushman, Zamecki & Anderson

[57] ABSTRACT

An improved hydraulic coupler suitable for interconnecting subsea fluid lines is provided with a radial seal between the male and female body portions. A C-shaped metallic seal is housed within the female body of the coupler, so that the seal may be checked or replaced if necessary between successive mating and unmating operations. An elastomeric secondary seal is also provided on the female body, and sealingly engages the same diameter cylindrical surface of the male coupler which is engaged by the C-shaped seal. A wiper member also mounted on the female body cleans this cylindrical surface as the body portions are brought together, thereby enhancing the reliability of both the elastomeric seal and the metallic seal. A guide for the valve poppet is threadably connected to a respective coupling body to increase reliability. Coupler halves may typically be housed within either a latchable subsea control module mounting base or a junction plate conventionally used in surface petroleum recovery operations.

20 Claims, 2 Drawing Sheets

RADIAL SEAL HYDRAULIC COUPLER

FIELD OF THE INVENTION

The present invention relates to a male/female fluid coupling with a radial seal and, more particularly, to a highly reliable fluid coupling suitable for sealably maintaining fluid pressure after repeated mating and unmating operations.

BACKGROUND OF THE INVENTION

Conventional male/female couplings have long been used to sealingly join pressurized fluid lines. The coupling halves, when joined, automatically enable the fluid and/or fluid pressure to be transmitted through the coupling without a significant pressure differential. When unmated, the valve poppet in the body of each coupler half automatically seals the fluid within each coupler body and its respective fluid line. Such couplers are able to reliably maintain high fluid pressure after repeated mating and unmating operations.

The seal between the joined coupling halves may conventionally be provided by either an elastomeric or metallic member. For many applications, the low cost, chemically inert quality, and non-corrosive characteristics of elastomeric materials has resulted in the commonplace use of such sealing members, including elastomeric seals manufactured from natural or synthetic rubber, Teflon, nylon, PEEK, or similar materials. In other applications, especially those wherein high reliability is paramount, metallic seals are preferable.

One type of coupler suitable for reliably interconnecting fluid lines employs a metallic face seal. Sealing engagement is provided by a metallic seal sandwiched between surfaces of the coupler halves, with each sealing surface being generally perpendicular to the axis of the coupler. One disadvantage of such couplers involves the significant axially-directed force necessary to mate the coupler halves, since the mating operation is resisted by both friction and the axially-directed biasing force of the compressible sealing member. Another significant disadvantage of metallic face seals relates to the difficulty in maintaining proper axial tolerances between these sealing surfaces.

Other types of couplers employ metallic radial seals which are sealingly responsive to fluid pressure. Current designs for these types of couplers are, however, susceptible to poor reliability. The male cylindrical surface to be engaged by the radial seal may contain debris which adversely affects sealing integrity. Sealing reliability of an elastomeric secondary radial seal is poor, and retainers for the seals are susceptible to blowout under high pressure pulsations.

The disadvantages of the prior art are overcome by the present invention, and an improved highly reliable coupler is hereinafter described.

SUMMARY OF THE INVENTION

An improved coupling for transmitting fluid pressure comprises conventional male and female body components. Unusually high reliability is obtained by providing a metallic compressible seal for sealing fluids between the coupling halves when mated. The seal is oriented for engagement with a substantially cylindrical surface on each body, which surface is axially aligned with the axis of the coupling. A secondary or backup elastomeric seal is provided on the female body for sealingly engaging the same diameter cylindrical surface as that engaged by the metallic seal. A separate elastomeric wiper positioned on the female body removes particulate, grease, or other matter from this cylindrical surface, thereby increasing sealing reliability. The retainer for the seals is threadably connected to the female body, thereby enhancing structural integrity of the coupling and reducing the likelihood of blowout. Poppet valves in each coupler half are axially supported by a guide threaded to a respective coupling body for increased durability, and includes a stop surface for limiting axial movement of each poppet valve, thereby ensuring that each poppet valve will unseat during the coupling mating operation.

In one suitable embodiment of the present invention, the coupling halves are mounted in subsea control module mounting bases. These bases, when clamped together, typically function in part to transmit fluid and fluid pressure from the surface to various components of a subsea petroleum recovery module. Since large numbers of couplings may be mated and unmated by latching the mounting bases together, the radial seal design reduces coupling force compared to coupling with face seals. When uncoupled, the coupling poppet valves seal fluid within the respective coupling halves and little fluid is lost to the environment. The couplings may also be employed in similar remote environments, such as subterranean petroleum recovery or outerspace operations.

The present invention thus provides a highly reliable coupling with improved performance over prior art couplings. The features and advantages of the present invention will be more fully understood from the subsequent description, wherein reference is made to the figures in the following drawings.

DETAILED DESCRIPTION OF PREFERRED EMBODIMENTS

Figure 1:
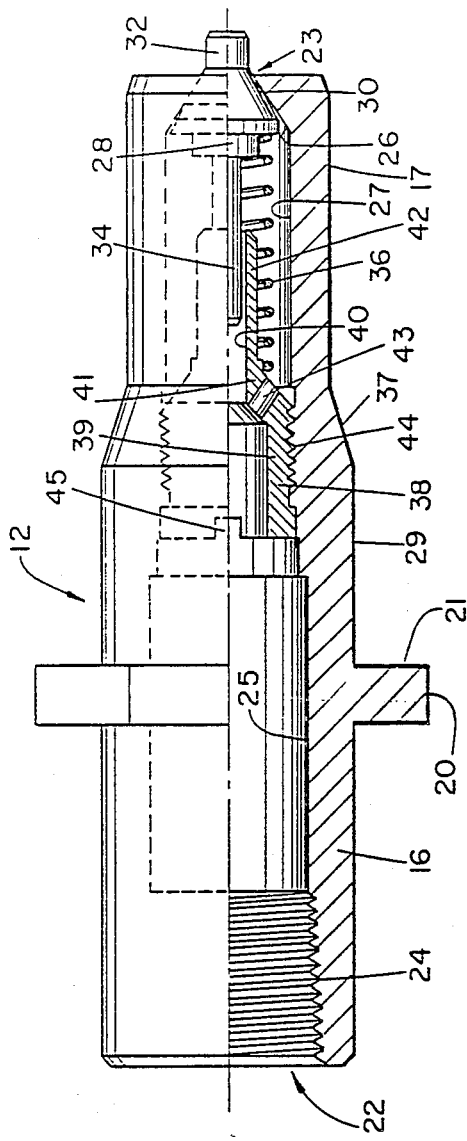
FIG. 1 is a side view, partially in cross-section, of the male coupling body according to the present invention.
Figure 2:
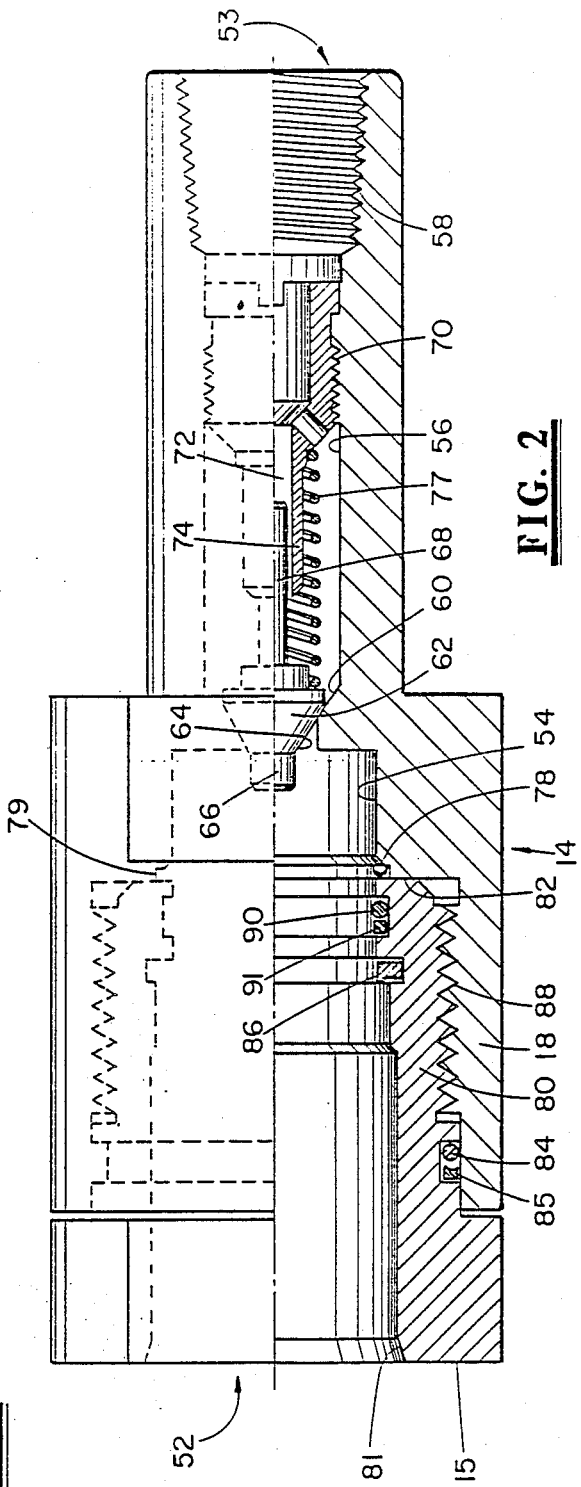
FIG. 2 is a side view, partially in cross-section, of the female half of the coupling.

Male coupling half 12 in FIG. 1 and the female coupling half 14 in FIG. 2 are shown axially aligned for mated engagement. Male component 12 includes a generally cylindrical body 16 having an expanded portion 20 with surface 21 for engagement with the end surface 15 of coupling half 14. Component 12 has a cylindrical passageway defined by two inner cylindrical surfaces 25,27 each having an axially aligned central axis and together interconnecting ports 22 and 23. The sidewalls adjacent port 22 are threaded at 24 for sealing with a suitable hose or line connection (not depicted).

The opposite end of coupling half 12 includes a conical surface 26 for metal-to-metal sealed engagement with valve poppet 28 which includes a similar conical end portion 30 and tip end 32. The valve poppet 28 is biased for sealing engagement with surface 26 by coil spring 36, which is held in place by guide 38. Guide 38 includes a central bore 40 for slidingly receiving stem portion 34 of poppet valve 28, and is threadably secured to the body 16 by threads 44.

Figure 3:
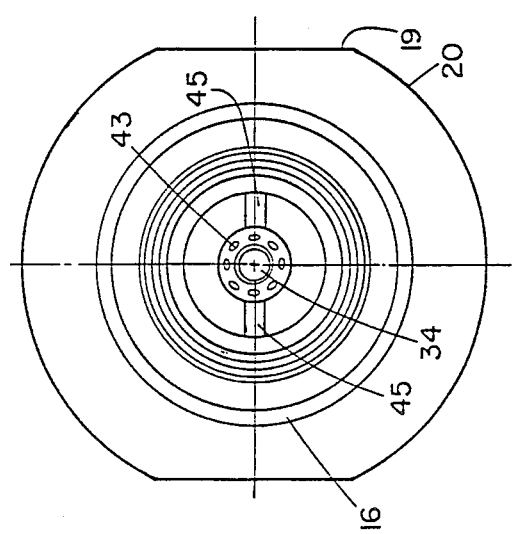
FIG. 3 is a left end view of the apparatus depicted in FIG. 1.

FIG. 3 depicts that expanded portion 20 includes planar exterior surfaces 19 which enable rotation of the male component with a conventional tool. Guide 38 is comprised of outer sleeve-shaped body portion 39, inner sleeve-shaped body portion 42 defining bore 40, and intermediate body portion 41. Portion 41 includes a plurality of passageways 43 which allow fluid to be transmitted through the coupling body 12 with little resistance. The rearward end of guide 38 includes a pair of radially opposing slots 45, which cooperate with a conventional tool (not shown) to enable the guide 38 to be easily threaded to the body 16.

FIG. 2 depicts female half 14 including a body 18 with a cylindrical configuration. Body 18 may also include two or more planar surfaces (not shown) for enabling rotation of the body 18 with a conventional tool. A central passageway defined in part by cylindrical surface 56 having an axis aligned with the axis of the passageway of male member 12 interconnects ports 52 and 53. The female body central passageway includes a large diameter male-body-receiving portion generally defined by cylindrical wall 54, a sealing portion bounded by conical surface 60, and a threaded end portion formed by threads 58. Valve poppet 62 includes a conical sealing surface 64, tip end 66, and cylindrical stem portion 68 similar to the components previously described. A guide 70 is also provided within the female body 18. Guide 70 includes sleeve portion 74 forming bore 72 for receiving stem portion 68, and is similar to the guide 38 described above.

When uncoupled, the valve poppets seal with the metal body of the coupling halves to seal fluid within each coupling half and its respective fluid line. When coupled, tip ends 32 and 66 engage, compressing springs 36 and 77 and thereby unseating the valve poppets from the metal sealing surface of the respective coupling body. When coupled, a fluid tight seal between bodies 16 and 18 is obtained by circular metallic ring 78. Seal 78 sealingly engages cylindrical surfaces 17 and 79, each having an axis aligned with the axis of the passageway through the metal coupling.

Metal seal 78 is retained in body 18 by seal retainer 80, which in turn is threadably secured to the body 18 and held in engagement with surface 82 by threads 88. An exterior surface of the retainer 80 may thus be formed similar to surface 19 to facilitate threaded engagement of the retainer to the female body with a conventional tool. An O-ring static seal 84 is provided axially positioned between the threads 88 and end surface 15 for sealing between body 18 and retainer 80, and sealing integrity may be increased by providing compressible backup member 85. The seal 84 and backup member 85 are preferably axially spaced opposite the metal seal 78 with respect to the threads 88. Seal 84 both prevents exterior fluids, such as sea water, from engaging threads 88, and also acts as a backup static seal to any fluid which may pass by metal seal 78 and threads 88. A wiper seal 86 is contained on retainer 80, and serves to wipe clean surface 17 as the coupling is mated, thereby increasing the sealing reliability of metallic seal 78. An elastomeric O-ring 90 with a compressible backup member 91 provides a secondary seal to the primary metallic seal 78.

It is a feature of the present invention that sealing integrity between the mated male and female coupling bodies is provided by a metallic pressure responsive primary seal 78, an elastomeric secondary seal 90, and a wiper seal 86—each of which engages the same diameter cylindrical surface 17 of the male body. The wiper seal 86 is primarily provided for wiping debris off the surface 17 as the coupling is mated, thereby providing a clean sealing surface for both seals 90 and 78, and need not accomplish any sealing function between the male and female body components. Sealing integrity of seal 90 is enhanced by providing a separate member 86 for wiping the sealing surface 17 of the male body, rather than attempting to accomplish both wiping and sealing functions with seal 90. This arrangement also ensures that a "fluid lock" situation cannot develop as the coupling halves are mated and/or unmated, which situation may occur if the seals 78 is adapted for sealing on a smaller diameter cylindrical surface of the male body than the surface on the male body adapted for sealing with seal 90.

During the mating operation, the larger diameter outer cylindrical surface 29 on the male component 12 engages the retainer 80 and thereby serves to align the body 16 with the body 18. During alignment, the conical surface 37 on the male body between surfaces 17 and 29 engages the chamfered surface 81 of retainer 80. Surface 29 thus is generally aligned with the retainer and therefore with surface 54 before the metallic seal 78 engages surface 17. The smaller diameter outer cylindrical surface 17 is not likely to become knicked or otherwise damaged during the alignment process, and therefore serves as a reliable sealing surface for the metallic seal 78. Alignment of the coupling bodies is thus achieved by the cooperation of surface 29 with the retainer 80, and the axial tolerance between surfaces 79 and 17 necessary for reliable sealing by the metallic seal 78 is easily obtained.

Figure 4:
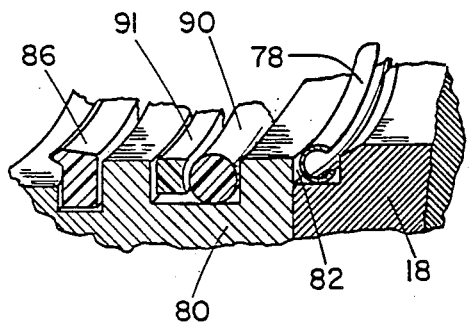
FIG. 4 is a cross-sectional pictorial view of a portion of the housing and radial seal shown in FIG. 2.

Referring to FIGS. 2 and 4, retainer 80 and body 18 form an annular cavity 82 having rectangular cross-sectional configuration for receiving the metallic C-ring 78. Retainer 80 thus prevents substantial movement of seal 78 with respect to the female body 18, and retains the seal 78 within the body 18 prior to mating of the coupling. Regardless of the direction of fluid flow through the male coupling, the circumferential slot in seal 78 is provided opposite the body of the male component 16. The base side of the seal (the side opposite the slot) is thus engaged during the mating operation, thereby allowing the cylindrical surface 17 to easily slide by the seal 78. The seal may be provided on either the male or female component, although when provided on the female component, as shown in FIG. 2, the metallic seal is protected with the body 18. In the embodiment described herein, the female component is also the component which is returned to the surface with the modular mounting base, so that the seal is provided on both the female component (for protection) and the retrievable component (for facilitating inspection and/or replacement).

The retainer 80 is preferably threadably secured to the body 14, as shown in FIG. 2. This arrangement provides the strength necessary to prevent failure of the mechanical connection between the retainer and the female body which may otherwise occur when high pressure pulsations pass through the coupling. In addition, torqued engagement of the retainer with planar surface 82 on the female body reliably controls axial "play" or movement of the metallic seal 78 with respect to the female body. Most importantly, the coupling of the present invention is thus less susceptible to failure and can more reliably withstand high pressure pulsations.

The end surface of each guide 38 and 70 serves as a stop surface to limit axial movement of the poppet valves, and is selectively axially spaced from each poppet valve (when in the sealing position within its respective uncoupled valve body) to ensure that both poppet valves will unseat from their respective sealing surface when the coupling is mated, in spite of anticipated axial dimension variations between the male and female coupling bodies.

Metallic seal rings are commercially available in C, E, W, O, and V configurations, with a preferred configuration for each particular situation depening on the fluid, the fluid pressure, the pressure differential across the coupling, and cost. Such metallic seals are available in various noncorrosive, spring-like materials, such as Inconel, X-750. Also, such compressible radial seal metallic seals are available in various sizes for axial applications. It is well known that the C-shaped configuration allows fluid pressure in the coupling to enhance sealing efficiency. The seals are also available at various tolerances depending on the anticipated internal and/or external pressure range.

Figure 5:
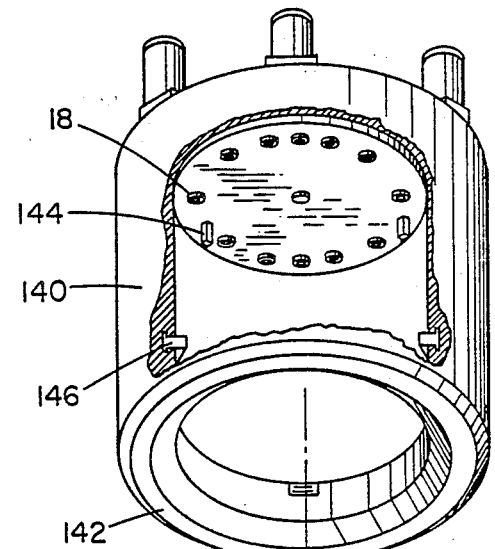
FIG. 5 is a simplified pictorial view of a coupling according to the present invention mounted in umbilical junction plates of an above ground petroleum recovery operation.
Figure 5:
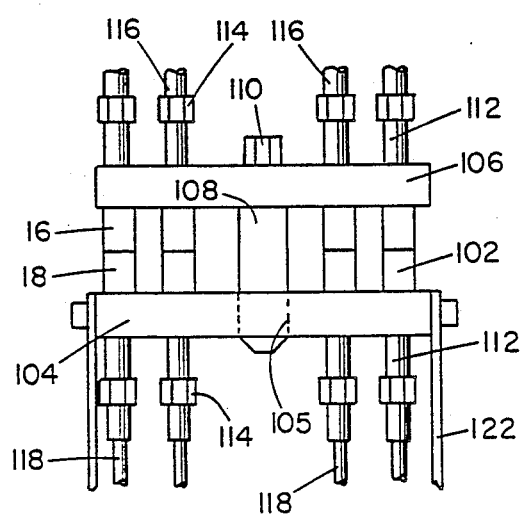
Figure 5:
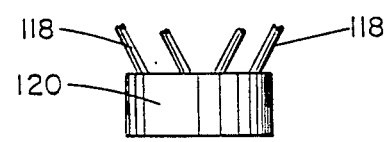

In one application, a plurality of couplings 102 comprising bodies 18 and 16 are provided in respective female and male umbilical junction plates 104 and 106, respectively. A central guide pin 108 secured to plate 106 by nut 110 fits within aperture 105 of plate 104. Extending upward from plate 106 are a plurality of downstream pressure nipples 112 interconnected at 114 with lines 116. Similar nipples 112 are connected to the umbilical junction plate 104 containing female portion 18 of the couplings, and are connected at 114 to downstream pressure lines 118. Lines 118 may be interconnected to a standard hydraulic umbilical member 120, and may thereafter be hydraulically connected to various types of fluid or pressure controlled equipment, or to fluid pressure transmitters. Although only four lines are shown coupled in FIG. 5, it should be understood that dozens of couplings may be connected by a single pair of umbilical junction plates. The components shown in FIG. 5 may be mounted to umbilical strain relief plates 122. The umbilical junction plates and mated couplings depicted in FIG. 5 typically represent a portion of the monitoring and/or control system of a hydrocarbon recovery operation.

Figure 6:
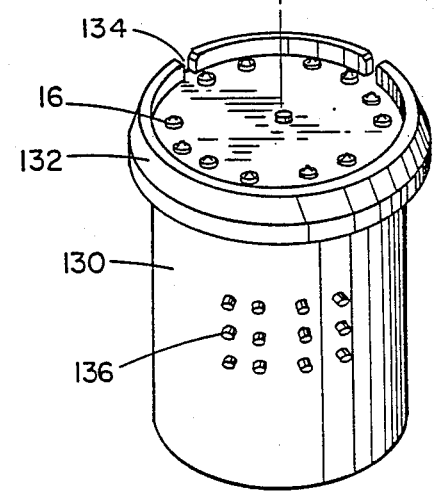
FIG. 6 is a simplified pictorial view of coupling halves according to the present invention each mounted in a subsea control module mounting base.

FIG. 6 depicts the coupling of the present invention in a subsea petroleum recovery well environment. Male body members 16 are mounted in a control module mounting base 130 with end portions and tip ends 32 extending upward from flange portion 132. Coupling halves 16 provide hydraulic connection between ports 136 and one or more pressure responsive components, such as a fluid actuatable valve, not shown. Notches 134 in flange 132 enable keys in a corresponding female mounting base to properly align the two bases. When mating, the coupling halves thus interconnect fluid lines without loss of fluid or fluid pressure. When mated, the coupling halves hold fluid and fluid pressure within the internal passageway of each coupling half and its respective interconnected lines. Mating and unmating of the couplings result in little, if any, loss of fluid to the environment.

The female halves 18 are each similarly mounted in a female mounting base 140. The axes of the bases 130 and 140 are shown in line for mating engagement. Mating of the mounting bases thus mates each of the coupling halves 16 and 18. When keys 144 are aligned with slots 134, the respective coupling halves are also aligned. End portion 142 is tapered for facilitating subsea alignment of the mounting bases. Latch dogs 146 act to mechanically lock the coupling halves together. Lines (not shown) are connected to the coupling halves 16, and allow fluid to travel from a source, e.g., at the surface, to ports 136 through the coupling valves 16 and 18, and then to fluid controlled equipment within a control module (not shown) mounted on top of the female mounting base 140.

The cost of a coupling used in such subsea control modules is minor compared to the cost of labor, equipment, and delay costs associated with repair operations should the couplings not properly mate, or should a mating coupling leak. Also, a fluid loss from the mated coupling could result in the absence of control pressure to subsea equipment, thereby jeopardizing the safety of the entire hydrocarbon recovery operation. Accordingly, utmost physical mating and sealing reliability of couplings is critical to the present invention.

The subsea mounting bases may be coupled and uncoupled six or more times during the life of the subsea operation. When retrieved to the surface, the female coupling halves, including the metallic and elastomeric seals, may be checked and replaced, if necessary. Due to the high mating and sealing reliability requirement for such couplings, as previously mentioned, coupling designs are typically approved for subsea operations only after being tested by coupling and uncoupling the coupling halves hundreds of times without failure. After each coupling and uncoupling operation, fluid pressure within the coupling and coupling halves must be maintained at levels substantially in excess of those normally anticipated for such subsea operations.

Although the invention has been particularly described in the environment of surface or subsea petroleum recovery operations, it should be understood that a coupling of the type described herein may be used in various application. In particular, the primary benefits of high reliability (both in terms of mating and sealing efficiency) and reduced axially directed coupling force render the coupling particularly well suited for remote operations. The coupling herein described would thus be well suited for use in subterranean operations, in medical equipment and techniques, and in outer space applications.

Although the retainer 80 is herein described as being held in place by threads, it should be understood that other conventional means, such as set screws, could be used to secure this component within its respective housings. Also, those skilled in the art should recognize that biasing means other than coil springs 36 and 77 may be employed to bias the valve stems toward sealing engagement with their respective bodies when the coupling is disengaged.

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a hydraulic coupling of the type employing male and female coupling bodies each having a fluid passageway therethrough for the transmission of fluid, the axes of each fluid passageway being aligned when the coupling is mated and unmated, each coupling body including a sealing surface for sealing engagement when the coupling is unmated with a valve poppet movably mounted within the respective coupling passageway, the valve poppets within each coupling body having tip ends adapted for engagement when the coupling is mated for unsealing each valve poppet from its respective sealing surface within the coupling body and thereby allowing the transmission of fluid through the mated coupling, the improvement comprising:

the male coupling body including a cylindrical outer metal surface of a uniform diameter;
a circular metallic-material seal ring housed within the female body for sealing engagement with the cylindrical outer surface of the male coupling body and an inner surface of the female coupling body for sealing the coupling bodies when mated;
retainer means for retaining the metallic ring with the female body;
a circular elastomeric-material seal ring carried on the retainer means for sealing engagement between the cylindrical outer surface of the male coupling body and the retainer when the coupling bodies are mated; and
a wiper ring carried on the retainer means for wiping the cylindrical outer surface of the male coupling body while the coupling bodies are moved into mating engagement;
the elastomeric-material seal ring being axially positioned between the wiper ring and the metallic-material seal ring such that the wiper seal wipes the outer surface of the male coupling body, the elastomeric-material seal ring then engages the outer surface of the male coupling body, and the metallic-material seal then engages the outer surface of the male coupling body as the male and female coupling bodies are moved into mating engagement.

2. The improvement as defined in claim 1, wherein the metallic-material seal ring includes a central bore open to fluid pressure within the mated coupling.

3. The improvement as defined in claim 2, wherein the metallic-material seal ring has a C-shaped cross-sectional configuration along the entire length thereof with a circumferential slot open to fluid pressure within the mated coupling.

4. The improvement as defined in claim 1, further comprising:
an elastomeric backup ring in engagement with the elastomeric-material ring.

5. The improvement as defined in claim 1, wherein the retainer means comprises:
a sleeve-shaped retainer for engagement with an internal stop surface of the female coupling body; and
threads on the retainer for threaded engagement with the female coupling body.

6. The improvement as defined in claim 1, further comprising:

biasing means within each coupling body for biasing the valve poppet toward sealing engagement with the sealing surface of the coupling body; and
the valve poppet includes a cone-shaped portion for sealing engagement with the sealing surface of each coupling body.

7. The improvement as defined in claim 1, further comprising:
the male coupling body including an outer cylindrical alignment surface having a diameter greater than the cylindrical outer metal surface for engagement with the retainer means to axially align the male and female coupling bodies before the metallic-material seal ring sealingly engages the cylindrical outer metal surface of the male coupling body.

8. The improvement as defined in claim 6, wherein the passageway through each coupling body is substantially cylindrically-shaped, and wherein the biasing means comprises a coil spring.

9. The improvement as defined in claim 8, wherein opposite ends of each coupling body are threaded for sealing engagement with respective fluid lines.

10. The improvement as defined in claim 5, further comprising:
a static elastomeric-material seal between the retainer and the female body and spaced axially opposite the metallic-material seal ring with respect to the threads on the retainer.

11. In a hydraulic coupling of the type employing male and female coupling bodies each having a fluid passageway therethrough for the transmission of fluid and including a sealing surface for sealing engagement when the coupling is unmated with a valve means movably mounted within the respective passageway of each coupling body, the female coupling body having a fluid input end and an opposing male-receiving end, the valve means within each coupling body having end portions adapted for engagement when the coupling bodies are mated for unseating each valve means from its respective sealing surface for allowing the transmission of fluid through the mated coupling, the improvement comprising:

the male coupling body including a cylindrical outer sealing surface of a uniform diameter;
a first seal ring for sealing engagement between the cylindrical outer surface of the male coupling body and a sealing surface on the female coupling body, the first seal ring in cross-section having an opening facing the fluid input end of the female coupling body to increase sealing effectiveness of the first seal ring;
retainer means for retaining the first seal ring within the female coupling body and having threads for threaded engagement with the female coupling body; and
a second compressible elastomeric-material seal ring carried on the retainer means for sealing engagement between the retainer and the cylindrical outer sealing surface of the male coupling body;
the second seal ring being axially spaced such that the second seal ring engages the outer surface of the male coupling body, then the first seal ring engages the outer surface of the male coupling body as the male and female coupling bodies are moved into mated engagement.

12. The improvement as defined in claim 11, further comprising:

a wiper ring carried on the retainer means for wiping the cylindrical outer surface of the male coupling body while the coupling bodies are moved into mating engagement;

a static seal between the retainer and the female body and spaced axially opposite the metallic-material seal ring with respect to the threads on the retainer.

13. The improvement as defined in claim 11, wherein the first seal ring is a compressible metallic-material seal ring.

14. The improvement as defined in claim 13, further comprising:

stop means on each coupling body for limiting axial movement of the valve means away from its respective sealing surface; and the axial position of each stop means is selected such that at least one valve means engages its respective stop means and the end portions of the valve means engage before the coupling bodies are mated.

15. The improvement as defined in claim 11, further comprising:

the male coupling body including an outer cylindrical alignment surface having a diameter greater than the cylindrical outer metal surface for engagement with the retainer means to axially align the male and female coupling bodies before the metallic-material seal ring sealingly engages the cylindrical outer metal surface of the male coupling body.

16. A method for sealingly mating a hydraulic coupling of the type employing male and female coupling bodies each having a fluid passageway therethrough for the transmission of fluid, the axes of each fluid passageway being aligned when the coupling is mated and unmated, each coupling body including a sealing surface for sealing engagement when the coupling is unmated with a valve means movably mounted within the respective passageway of each body, the valve means within each coupling having tip ends adapted for engagement when the coupling bodies are mated for unsealing each valve means from its respective sealing surface in the coupling body for allowing the transmission of fluid through the mated coupling, the method comprising:

forming a cylindrical outer sealing surface of a uniform diameter on the male coupling body;

forming an inner sealing surface on the female coupling body;

placing a first ring on the female coupling body for sealing engagement with the cylindrical outer surface of the male coupling body when the coupling bodies are mated;

threading a retainer to the female coupling body to retain the first seal in the female coupling body;

positioning an elastomeric-material second ring on the retainer for sealing engagement with the cylindrical outer surface of the male coupling body;

positioning a wiper ring on the retainer for wiping the cylindrical outer surface of the male coupling body; and moving the male coupling body toward mating engagement with the female coupling body, such that the wiper ring first wipes the cylindrical outer surface of the male coupling body, the elastomeric-material seal then engages the cylindrical outer surface of the male coupling body, then the first seal ring engages the cylindrical outer surface of the male coupling body.

17. The method as defined in claim 16, further comprising:

providing a metallic-material seal ring for the first seal ring with a central bore open to fluid pressure within the mated coupling.

18. The method as defined in claim 16, further comprising:

providing a static seal between female body and the retainer and positioned axially opposite to first seal with respect to threads on the retainer.

19. The method as defined in claim 16, further comprising:

forming a cylindrical alignment surface on the male coupling body having a diameter greater than the cylindrical sealing surface; and axially aligning the male and female coupling bodies by engaging the cylindrical alignment surface with the retainer before the first seal engages the cylindrical outer surface on the male body.

20. The method as defined in claim 16, further comprising:

biasing the valve means of each coupling body for sealed engagement with the sealing surface of the coupling body; and providing a stop surface on each coupling body for limiting axial movement of the valve means away from its respective sealing surface, the stop surface on each valve body being at a selected axial position such that each valve means is forced out of engagement with its respective sealing surface before said coupling bodies are fully mated.

* * * * *